Fig. 1.

United States Patent Office 3,155,968
Patented Nov. 3, 1964

3,155,968
RADAR-CONTROLLED GUIDANCE SYSTEM
Robert Matthews and Ronald Thomas Albert Howell, London, England, assignors to Decca Limited, London, England
Filed Apr. 7, 1958, Ser. No. 726,820
23 Claims. (Cl. 343—7)

This invention relates to apparatus for controlling the navigation of a vehicle, such as an aircraft, for making the vehicle travel along a required track or for guiding the vehicle by reference to a predetermined position line.

According to this invention apparatus for controlling the navigation of a vehicle comprises first signal generator means arranged to generate electrical signals representative of the co-ordinates of the instantaneous position of the vehicle, further signal generator means arranged to generate electrical signals defining a required track in said co-ordinate system, and comparator means for comparing the signals from first signals generator means with the signals defining the required track to provide an output representative of the distance of the point represented by signals from said first signal generator means from the line defined by the output of said further signal generator means.

As will hereinafter be more fully explained, the apparatus is particularly applicable to the controlling of a vehicle such as an aircraft from a radar station employing a primary or a secondary radar system. The signals representative of the co-ordinate position of the aircraft may then be derived from a plan position radar display either manually or automatically by means of an echo follow system described and claimed in the specification of patent application No. 678,890 now U.S. Patent 3,120,660.

The output from said comparator means might be displayed at the radar station so that the output information can be transmitted verbally by a radio communication link to the vehicle. Alternatively the output may be automatically transmitted to the vehicle by a radio communication system. Display means may be provided on the vehicle for displaying the transmitted information or the information may be applied directly to an automatic pilot of the vehicle. The outputs would usually be available as voltages and information representative of these voltages may be transmitted over the radio communication system as modulations in any convenient way such as for example the methods employed in telemetering systems.

The vehicle may readily be guided so as to follow the aforementioned required track by controlling the course of the vehicle in such a manner as to keep the determined distance from the course as close as possible to zero. This distance might however be kept at some other selected and possibly varying value if it is required to travel along some other track. More generally if the distance along the required track line is known, by using a straight track line, the co-ordinate position of the vehicle can be obtained and the apparatus might be used for determining and transmitting the position of a vehicle anywhere within the coverage area of a radar station. It will be understood therefore that reference to a required track line does not necessarily mean that the vehicle is to be made to follow along this line but includes more generally navigational control by reference to such a line.

In apparatus for use when the required track in plan position is a straight line, the aforesaid first signal generator means may be arranged to generate two signals representative in Cartesian co-ordinates of the plan position of the vehicle and said further signal generator means may be arranged to provide two signals representative of the co-ordinate position in the same co-ordinate system of a point on the required track and also a signal or signals representative of the angular direction of the required track, and said comparator means may comprise means for determining the differences between the outputs from said first signal generator means and the corresponding outputs from said further signal generator means representative of said point, resolving means controlled by or in accordance with the signal or signals representative of the angular direction of the required track arranged to resolve said differences into components along and transverse to the track and combining means to combine the resolved components transverse to the track to provide an output representative of the distance of the vehicle from said track. There may also be provided combining means to combine resolved components along the track to provide an output dependent on the distance of the vehicle along said track from said point. It will be appreciated that, if the distance to any other point along the required track is required, it may be obtained by simple subtraction or addition which may readily be effected electrically. Thus an output signal can be provided representative of the distance of the vehicle along the track from any selected point such as, for example, the starting point or the final destination.

The arrangement described in the previous paragraph is particularly convenient for use with radar systems in which there is provided a cathode ray display tube with fixed deflector means for deflecting the cathode ray beam in two orthogonal directions and interscan trace generating means of the kind described and claimed in the specification of U.S. Patent No. 2,849,708, which specification describes apparatus for generating interscan line traces in the intervals between the radar display scans by making use of voltages representative of the position of start of the required interscan line trace and also rate controlling voltages representative of the required rates of scan in the two co-ordinate directions of deflection. Such an interscan line trace may be made curved if desired by use of suitable waveforms for the rate controlling voltages. With radar display apparatus having such an interscan display system, the required track may be displayed as a trace on the screen of the tube and the position control voltages for controlling the position of the start of the interscan line trace may be used as one of the inputs to the comparator means. However, there is no need to display the aforementioned line trace on the screen of the tube although in general it will be most convenient to do so. All that is required is that there shall be available voltages representative of the end or of some particular point on this line and also information about its direction.

In another arrangement, apparatus for controlling the navigation of a vehicle along a required track comprises electrical waveform generators arranged to generate repetitive synchronised waveform representative of the co-ordinates of the required track of the vehicle signals generator means arranged to generate electrical signals representative of the co-ordinates of the instantaneous position of the vehicle and comparator means for determining the differences between the signals representative of the vehicle position and the corresponding co-ordinate instantaneous output signals of said waveform generators at simultaneously occurring instants in the waveform cycles and for providing from said determined differences an output representative of the distance of the vehicle from said line. More particularly, for controlling the navigation of a vehicle along a required track in plan position, the apparatus may comprise two electrical waveform generators arranged to generate repetitive synchronised waveforms representative of the co-ordinates in plan position of the required track for the vehicle, signal generator means arranged to generate two electrical signals representative respectively of the two co-ordinates of the instantaneous position of the vehicle and two comparator means for determining the differences between the signals representative of the vehicle position and the corresponding co-ordinate instantaneous output signals of said waveform generators at simultaneously occurring instants in the waveform cycles and for providing from said determined differences an output representative of the distance of the vehicle from said line.

The aforementioned comparator means may include pulse sampling demodulators for sampling and storing voltages representative of the required instantaneous output signals of said waveform generators, means for obtaining difference signals having magnitude proportional to the differences in the co-ordinate directions between the signals representative of the vehicle position and the sampled voltages and resolving and combining means controlled in accordance with the direction of the track at the point corresponding to the sampling position for resolving and combining the difference signals to provide an output representative of the distance of the vehicle from said line. The aforementioned resolving and combining means may also be arranged to provide an output representative of the distance of the vehicle along said track from a selected point. A rate-aiding circuit may be provided for controlling the instant of sampling of said pulse sampling demodulators so that the sampling point traverses along the track at an adjustable rate which may be said to correspond to the speed of the vehicle.

In any of the above described arrangements the aforesaid signal generator means for generating signals representative of the position of the vehicle may comprise manually controlled voltage generator generating means, for example a manually operable sine-cosine potentiometer and manually operable voltage controlling means controlling a voltage applied to the potentiometer. Alternatively the signal generator means may comprise a primary or secondary radar system and means responsive to the received radar signals for automatically producing voltages representative of the position of the vehicle. For example, for controlling navigation of the vehicle in plan position, the voltages representative of the position of the vehicle may be automatically produced by apparatus as described and claimed in the specification of patent application No. 678,890, now U.S. Patent 3,120,660.

Any of the forms of apparatus described above are preferably arranged in combination with a primary or secondary radar system having a plan position cathode ray tube display and the aforementioned signal generator means for generating signals representative of the position of the vehicle are arranged to control an electronic marker at said display. A further electronic marker in the form of a line trace may be arranged on said display to represent the required track.

According to another feature of the invention, apparatus for controlling the navigation of a vehicle from a radar station having a cathode ray display tube with fixed deflector means for deflecting the cathode ray beam in two orthogonal directions comprises a marker system for producing a movable electronic marker on the screen of a tube by applying two marker deflection signals of adjustable magnitude to said deflector means for effecting deflection of the cathode ray beam in the two orthogonal directions, means for producing signals representative of a position of a line trace on said screen corresponding to a track to be followed by said vehicle, and two comparator means for determining the differences between the magnitudes of each of the two marker deflection signals and of two corresponding signals representative of a point on the line trace and for providing from said predetermined differences two outputs representative of the distance of the marker from a point on said line and the distance along the line from the point nearest the marker to a datum point. With this arrangement, the marker is positioned on the screen over the response from the vehicle to be controlled and the comparator means will then give two outputs representative of the distance of the vehicle along its required track and the distance off the track.

The following is a description of a number of embodiments of the invention, reference being made to the accompanying drawings in which:

FIGURE 2 is a block diagram illustrating another form of the apparatus for controlling a vehicle along a predetermined line or with reference to a predetermined line;

FIGURES 3 and 4a, b, c and d are explanatory diagrams for explaining the operation of the system of FIGURE 2.

The apparatus of the present invention is particularly applicable to the controlling of a vehicle, for example an aircraft or ship, in plan position and although it is not essential for the invention to employ radar apparatus giving a plan position display, most conveniently the apparatus of the present invention is used in association with such a radar plan position display.

Figure 1:
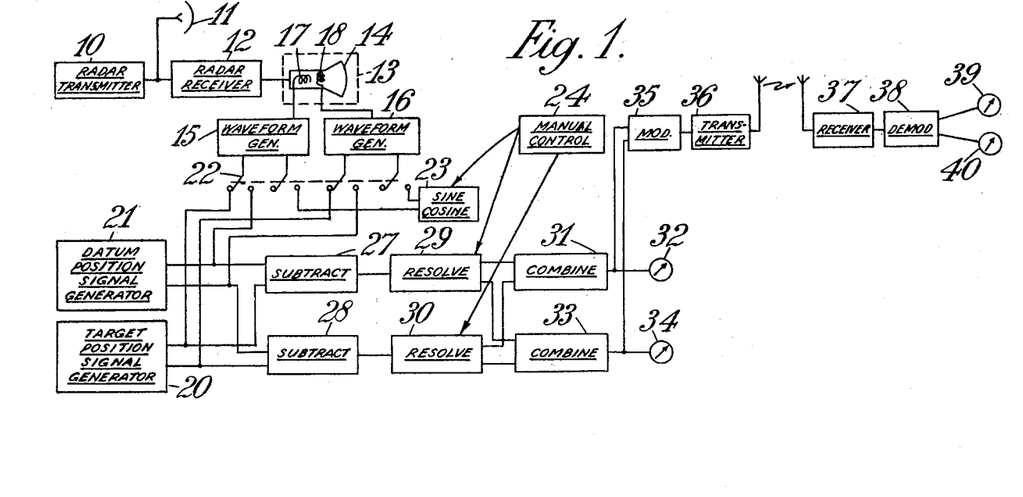
FIGURE 1 is a block diagram illustrating one form of apparatus for controlling the navigation of a vehicle along a straight line or with reference to a straight line.

Referring to FIGURE 1, there is illustrated diagrammatically radar apparatus comprising a transmitter 10, a scanning antenna 11 and a receiver 12, the receiver feeding a display unit 13 which includes a cathode ray tube 14 on which the radar apparatus provides a plan position display. In the particular embodiment illustrated, this display unit is of the type known as a fixed coil display in which the cathode ray tube has fixed deflector coils to which appropriate deflecting signals are applied to effect scanning of the cathode ray beam and preferably the deflection scanning system is the type described and claimed in the specification of U.S. Patent No. 2,849,708 in which interscan marker lines may be displayed on the screen of the tube in the intervals between radar display scans. Reference may be made to the specification of U.S. Patent No. 2,839,708 for a further description of such a system, but as explained elsewhere, for example in the specification of the aforementioned patent application No. 678,890, now U.S. Patent 3,120,660, it is not necessary to have a separate waveform generator system for each interscan and there are illustrated in FIGURE 1 of the accompanying drawings two waveform generators 15, 16 feeding fixed deflector coils 17, 18 for effecting deflection of the beam of the cathode ray tube 14.

The present invention is more particularly concerned with the control of the navigation of a vehicle. If the position of the vehicle is determined from the radar display, most conveniently a target marker, for example a small circle, is provided on the screen of the display to mark the particular vehicle which is to be controlled. For this purpose there is provided a target position signal generator 20 which produces two direct voltage outputs representative of the co-ordinate position of the vehicle on the screen of the tube. These voltages might be used directly to control the deflection of the cathode ray beam but preferably they are applied to shift control inputs of the waveform generators 15, 16 which waveform generators are of the kind comprising a high gain amplifier having two alternative input and feedback circuits. One input and feedback circuit comprises a resistive input and a resistive feedback for the amplifier and the other comprises a resistive input and a capacitive feedback. As is well known, such a circuit would provide a sawtooth output having a starting point dependent on the voltage applied to the resistive input of the first input and feedback circuit, which input is therefore referred to as the shift control input, and having a slope dependent on the voltage applied to the resistive input of the second input and feedback circuit, which input circuit is therefore referred to as the rate of scan input. A fuller description of such waveform generating circuits applied to the deflection of a cathode ray tube for radar apparatus is given in the specification of U.S. Patent No. 2,994,868. The voltage from the target position signal generator 20 is applied to the shift control inputs of the waveform generators 15, 16 and, if a zero voltage is applied to the rate of scan control inputs (for example by interrupting the rate of scan control input) a stationary marker will be produced on the cathode ray display tube. The inputs of the two scanning waveform generators may be modulated in phase quadrature by a small amplitude alternating current so that the spot becomes a small circle. Such a method of marking the position of a selected target on a cathode ray tube is known and is described for example in the specification of patent application No. 695,789, now abandoned. This target position marker thus is formed as one interscan trace on the screen of the display tube 14.

The vehicle in the arrangement of FIGURE 1 is to be guided along a straight line or with reference to a straight line, which line is defined by two co-ordinates representing a point on the line, conveniently the starting point, and by the direction of the line. Direct voltages representative of the co-ordinates of the starting point of the line are produced by a datum position signal generator 21 and these two voltages are applied respectively to the shift inputs of the waveform generators 15, 16 to control another interscan marker trace which is also produced in the intervals between the radar display traces. It will be understood that each individual interscan trace may have a much lower repetitive rate than the pulse recurrence frequency of the pulse radar system so that a large number of independent interscan traces may be provided if required. In FIGURE 1, switches 22 are illustrated diagrammatically for switching the shift input circuits; these switches would be electronic switches to give the necessary speed of operation and the circuits for producing the radar display scans have been omitted for simplicity. When the datum position inputs are applied to the waveform generators 15, 16, sine and cosine direct voltage signals from a sine-cosine signal generator 23 are applied to the rate of scan inputs of the waveform generators so as to produce a line trace on the screen of the cathode ray tube 14 in a direction dependent on the setting of the sine-cosine signal generator 23, which setting is determined by a manual control 24.

In the arrangement of FIGURE 1 the two signals representative of the position of the start of the line trace and the two signals representative of the target position are fed to subtracting units 27, 28 which determine the differences between the two co-ordinates representative of these two points, taking due account of the signs (i.e., the polarities) of the signals. To determine the distance of the point represented by the output of the signal generator 20 from the line defined by the output of the signal generator 21 and the setting of the manual control 24, the difference signals from the subtracting units 27, 28 are resolved by resolvers 29, 30, which are controlled by the manual control 24, into components in the direction of and transverse to the line. The two outputs from the resolvers 29, 30 which are representative of distances along the track are combined in a combiner 31, the output of which is displayed on an indicator 32 and the two outputs of the resolvers 29, 30 which are representative of distances transverse to the track are combined in a combiner 33 and displayed on an indicator 34. The apparatus of FIGURE 1 is operated by setting the datum position signal generator 21 and the manual control 24 to define the required track line and by adjusting the target position signal generator (assuming there is no automatic following system) to cause the target marker to follow the movements of the vehicle on the display tube.

It will be seen that the indicators 32, 34 given a visual indication of the distance of the vehicle along the track and the distance off the track. It will readily be apparent that, by suitable choice of the zero indication and direction of movement of the indicator 32, the distance along the track may be measured either from the beginning or from the end or from any required point along the length of the track. The outputs on the indicators 32, 34 may be used for controlling the vehicle verbally by means of a radio communication link to the aircraft. Alternatively one or both of the outputs may be automatically transmitted to the vehicle by a radio communication system and such an arrangement is indicated diagrammatically in FIGURE 1 where the outputs from the combiners 31, 33 are fed to a modulator 35 for modulating a transmitter 36. At the vehicle the signals from the transmitter 36 are received by a receiver 37 and demodulated by a demodulator 38 to feed two indicators 39, 40 which give indications corresponding to the indications on the indicators 32, 34 at the radar station. It is not believed necessary to give any further description of the manner of transmitting the signals since many methods for transmitting such signals are well known, particularly for telemetering purposes. It will further be appreciated that the outputs from the demodulator 38 might be applied directly to an automatic pilot on the vehicle.

If the vehicle is required to travel along the straight track defined by the system, then the vehicle is navigated so as to keep to a minimum the distance off the track as indicated by the indicators 34 or 40 which indicators will indicate the distance and sense of deviation from the track. If necessary the voltage representative of the deviation may be differentiated with respect to time so that the rate of change of deviation can be presented, if required, to prevent yawing as the vehicle returns to course. The vehicle might also be navigated along a path different from that defined by the datum position signal generator 21 and the manual control 24 by controlling the vehicle so that the distance off the track as indicated by the indicators 34 and/or 40 is not zero but some predetermined, and possibly varying, value. It will be appreciated that in such a case if, for example, the manual control 24 was set to give a position line in a North-South direction, the indicators 32, 34 would indicate respectively the two co-ordinates of the position of the vehicle in the North-South and East-West directions and these co-ordinate indications might be used in any required manner to control the aircraft.

The arrangement may be used not only with a primary radar system, but also with a secondary radar system since, by the use of a transponder in the aircraft, the effective range at which the position of the aircraft may be determined would be greatly increased compared with that possible if the position had to be determined solely by means of a primary radar. Such a transponder would be responsive to radar transmissions but may retransmit the pulses back to the radar station either at the radar frequency or, more preferably, at a frequency in a completely different frequency band. The use of transponders operating in frequency bands different from the radar frequency permits of the transponders in separate vehicles operating on different frequencies so that the different responses at the radar station are separable and identifiable. Hence a single radar station may be arranged to control automatically a number of vehicles having transponders operating on different frequencies.

Instead of using a manually operable target position signal generator 20, the voltages representative of the position of the vehicle may be obtained from a radar set by means of an automatic echo follow system such as, for example, that described and claimed in the aforementioned specification of patent application No. 678,890.

As previously mentioned, a large number of interscan markers may be provided on one radar display and hence a single radar display may be used for controlling a number of vehicles provided separate target position signal generators 20, subtracting means 27, 28, resolvers 29, 30 and combiners 31, 33 are provided to give the necessary output indications or control signals.

The arrangement described with reference to FIGURE 1 for guiding the vehicle with respect to a straight line may be used for controlling an aircraft along an approach path or for guiding a ship into a harbour or along a selected channel if a straight line approach path is required. In some cases, however, it is required to guide the vehicle along a more complex path and in that case the arrangement of FIGURE 2 may be employed which permits of directly determining the deviation of a vehicle not only from straight but also from non-straight course lines.

Figures 2, 3:
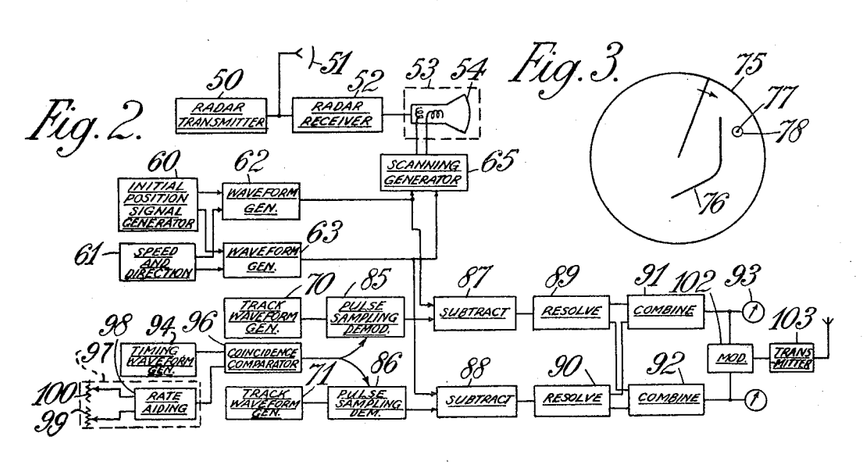

Referring to FIGURE 2 there is illustrated diagrammatically radar apparatus comprising a transmitter 50, a scanning aerial 51 and a receiver 52, feeding a display 53 having a cathode ray tube 54. This display is of the fixed coil type as described with reference to FIGURE 1.

Referring to FIGURE 2, the target position might be represented by voltages derived from a target position signal generator such as that shown at 20, FIGURE 1. In FIGURE 2 however a more complex arrangement employing rate-aiding is illustrated so that there is no need for manual control of a target position signal generator to follow the movement of the vehicle. In the arrangement of FIGURE 2 there is illustrated an initial position signal generator 60 which is set in accordance with the initial position of the vehicle when the apparatus is brought into use and which generates two direct voltages representative of the co-ordinate position of the vehicle and a speed and direction signal generator 61 for generating direct voltages representative of the components of the speed of the vehicle in two co-ordinate directions. A target marker interscan trace is produced on the screen of the tube 54 by feeding the outputs from the signal generator 60 to the shift control inputs of two waveform generators 62, 63 while the outputs from the signal generator 61 are fed to the scan control inputs of the waveform generators 62, 63. These waveform generators are arranged to generate linearly varying voltage waveform outputs having slopes proportional to the two speed components and having starting points dependent on the output from the signal generator 60. These outputs from the waveform generator 62, 63 will thus be voltages which will vary slowly in accordance with the change of position of the vehicle as determined by the speed and direction set on the signal generator 61. The arrangement thus forms a rate-aiding system so that output voltages are available continuously representative of the position of the vehicle without any necessity of manual following. Such a rate-aiding circuit is more fully described in the aforementioned specification of patent application No. 695,789 now abandoned. The direct voltage outputs from the waveform generators 62, 63 may be arranged to control a marker on the cathode ray tube 54 and for this purpose they are illustrated as being applied to a scanning generator unit 65 which may be similar to the waveform generators 15, 16 and associated switching means of FIGURE 1.

Figure 4:
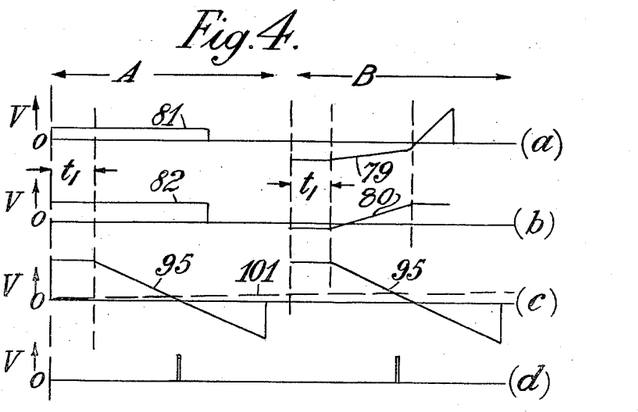

For generating the required track line, there are provided two track waveform generators 70, 71 which generate respectively repetitive sychronised waveforms representative respectively of the two co-ordinate components defining the required track. If this track is displayed on the screen of the tube 54, these waveforms might be obtained from the scanning generator 65. The scanning generator 65 however has to feed deflector coils which have some resistance and may be provided with damping resistors. The scanning generator 65 would, for this reason have a more complex waveform to compensate for non-inductive component of the load and it is therefore preferred to provide separate waveform generators 70, 71. The same control signals which control these waveform generators may be used for controlling the deflection scanning generators but for clarity in the drawing, such circuits for effecting the deflection of the cathode ray beam to produce an interscan trace corresponding to the required track are omitted in FIGURE 2. Referring to FIGURE 3 there is illustrated diagrammatically a plan position display 75 on which is marked a required track 76 and the position of a vehicle 77. The latter is illustrated as being marked by a circle target marker 78. The waveforms for the two directions of deflection to produce the required track 76 are illustrated in FIGURES 4a and 4b at 79 and 80 respectively. These two FIGURES 4a and 4b are diagrams illustrating the waveforms during two interscan periods which periods are marked as A and B respectively. Each of these two interscan periods would occur between radar display scans and there may be other different marker signals put on during other interscan periods. For simplicity, however, only the two periods A and B are illustrated. Period A is the interscan period for producing the target marker 78 and the waveforms necessary to produce this target marker are shown at 81, 82, the phase quadrature modulation for making the small circle being omitted for clarity. Each of the waveforms 79, 80, 81 and 82 has an initial period marked $t_1$ in which only the shift voltages are applied to the interscan waveform generators and a subsequent period in which the scanning voltages are applied as described in the aforementioned specification of U.S. Patent No. 2,849,708. For the target marker 78 since a fixed point is to be marked, the waveforms 81, 82 are lines of constant voltage throughout the interscan period. It will be appreciated that the corresponding waveforms for feeding the deflection coils of the cathode ray tube would be current waveforms and not voltage waveforms. For the required track line 76, the ratio of the waveform amplitudes 79, 80 varies according to the slope of the line in the appropriate co-ordinate direction. In practice such complex tracks may generally be built up from linear waveforms having different slopes.

For determining the distance of the vehicle from the track line, in the arrangement of FIGURE 2 it is required to select a particular point on the track line, to sample the track waveform voltages at this point and to compare these voltages with the voltages representative of the position of the vehicle. The sampling of the track waveform voltages is effected by means of pulse sampling demodulators 85, 86 which serve to sample and store voltages representative of the instantaneous values of the waveforms occurring at instants determined by an input sampling pulse. A form of pulse sampling demodulator suitable for this purpose is described with reference to FIGURE 2 of the specification of the aforementioned patent application No. 678,890 now U.S. Patent 3,120,660. The outputs from the pulse sampling demodulators 85, 86 are compared with the outputs from the waveform generators 62, 63 by comparison means similar to those employed in FIGURE 1 and comprising two subtracting units 87, 88, two resolvers 89, 90 and two combining units 91, 92. The resolvers 89, 90 have to be set in accordance with the direction of the track. In practice, however, they may be controlled manually in accordance with the direction setting of the speed and direction signal generator 61 employed for the rate-aiding circuit. It will be readily apparent, however, that the resolvers might be controlled automatically in accordance with the instantaneous direction of the required track, for example by pulse sampling, with pulse sampling demodulators, the scanning rate input signals for the track waveform generators and using the ratio of the outputs of these pulse sampling demodulators to control the two resolvers.

No reference has yet been made as to the manner of production of the control signals for the track waveform generators 70, 71 since this forms no part of the present invention. If the required track can be built up of a series of straight lines, the track waveform generators may comprise linear waveform generators to the rate of scan control inputs of which are applied, for each track waveform, a succession of constant direct voltages which may be provided by electronic switching of a number of direct voltage sources. To produce a curved track line using a linear waveform generator, the rate of scan control input must be varied and may be derived from another waveform generator.

The outputs from the combiners 91, 92 may be fed to indicators 93 and/or to a modulator 102 for a radio transmitter 103 in a manner similar to that illustrated in respect to FIGURE 1.

For selecting the timing of the sampling pulse for the pulse sampling demodulators 85, 86 there is provided a timing waveform generator 94 producing during each interscan period a linear waveform such as is shown at 95 in FIGURE 4c. The output from the timing waveform generator 94 is compared in a coincidence comparator 96 with a direct voltage output from a circuit 97. The coincidence comparator 96 compares these two voltages and produces a pulse when the two are equal. Such a coincidence comparator might, for example, comprise a pair of grid-controlled electronic valves arranged as a longtailed pair, that is to say having a common cathode impedance of high value, and the two voltages to be compared applied to the control grids of these two valves. As is well known, one or other of these two valves will be conductive according to which has the higher grid voltage and there will be a rapid change-over as the output of the timing waveform generator passes through the point of equality within the output from the circuit 97. The change-over in one direction is selected and used to produce a short duration pulse. This may be done, for example, by differentiating the output at the anode of one of the two valves of the longtailed pair and applying the differentiated signal to a suitable pulse shaping network.

In the simplest form the circuit 97 might comprise a manually operable potentiometer which can be set to give any required output voltage within the range of variation of output of the waveform generator 94. It is preferred, however, to apply rate-aiding to the signal to be compared with the output of the timing waveform generator 94 and in FIGURE 2 the unit 97 is illustrated as including a rate-aiding circuit comprising a waveform generator 98 arranged to generate a linearly varying voltage waveform having an initial starting position controlled by an adjustable input voltage from a source 99 and having a slope controlled by an adjustable input voltage from a source 100. The source 99 is adjusted in accordance with the initial position of the vehicle and the source 100 is adjusted in accordance with the speed of the vehicle. The rate-aiding circuit 98 will thus produce a linearly changing waveform changing at a rate proportional to the speed of the vehicle and starting from a datum position dependent on the initial position of the vehicle. The timing of the pulse produced by the coincidence comparator 96 will therefore gradually change at a rate dependent on the speed of the vehicle. This pulse is used as the sampling pulse for the pulse sampling demodulators 85, 86 and the gradual change in the timing of this pulse corresponds to the movement of the vehicle along the track line. In FIGURE 4d, there are illustrated the sampling pulses produced by the coincidence comparator 96 and it will be seen that these correspond in time to the intersection of the timing waveforms 95 with the sloping dashed line 101 which represents the effect of the rate-aiding circuit 98.

With the arrangement of FIGURE 2 the waveforms corresponding to the track line are sampled at a preselected point which is made to move along the track line. The sampled voltages are compared with the actual position of the vehicle and the differences are combined and resolved in such a manner as to provide an indication of the distance off the track and the distance from a preselected point along the track provided that the pulse sampling point is made to follow along the track in accordance with the nearest position on the track to the actual position of the vehicle. It will be appreciated that errors in the rate of movement of the sampling point along the track will not cause any errors in the indicated distances if the track is straight and will only cause second order effects if the track is curved and hence they are not of great importance.

In the apparatus of FIGURE 2, if the speed of the vehicle is constant along the whole track, then the track waveform generators 70, 71 are arranged to produce waveforms such that the track line trace 76 on the screen of the cathode ray tube is produced with a uniform velocity of movement of the beam across the screen of the tube, and the rate-aiding circuit 98 and the timing waveform generator 94 are arranged to produce linear waveforms. In some cases, however, it may be required that the vehicle should move along the track at a non-uniform speed; for example, an aircraft might be required at some stage to climb with a resultant reduced speed. By suitable choice of the waveforms from the track waveform generators 70, 71 so that the cathode ray beam moves at a correspondingly reduced speed in tracing out the track line 76 on the screen of the tube, a linear timing waveform generator 94 and a linear rate-aiding circuit 98 may still be employed.

Figure 5:
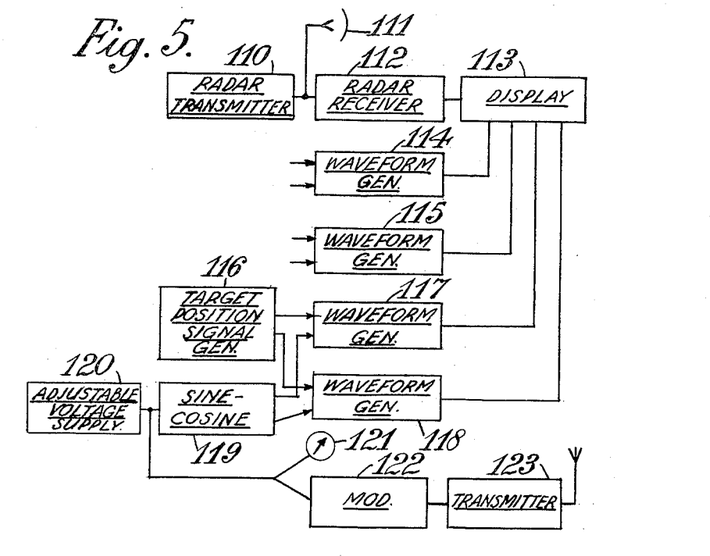
FIGURE 5 is a block diagram of another embodiment of the invention.

In some cases, at a radar station, it may be preferred to use a simpler system than that illustrated in FIGURE 2 and to employ manual following for obtaining the required information about the position of the vehicle with respect to the course line. One such simplified arrangement is illustrated in FIGURE 5 in which there is shown a radar system illustrated diagrammatically as comprising a transmitter 110, a scanning aerial 111 and a receiver 112, the latter feeding signals to a display 113. This display is assumed to be of the fixed coil type described above and having provision for displaying interscan traces. The required track for the vehicle is indicated on the display as such an interscan trace by means of two track waveform generators 114, 115. Voltages representative of the position of the vehicle are produced by a target position signal generator 116 which might comprise an automatic follow system as described with reference to FIGURE 2 or a manual system as described with reference to FIGURE 1. The output of this target position signal generator 116 comprises two voltages representing the co-ordinates of the position of the target and these are applied respectively to shift control inputs of two waveform generators 117, 118. To the rate of scan control inputs of these waveform generators there are provided two direct voltages representative of the sine and cosine components of the speed of the vehicle and these are illustrated in FIGURE 5 diagrammatically as being obtained from a sine-cosine potentiometer 119 which is energised from an adjustable voltage supply source 120. The voltage supply source 120 is adjusted to a value corresponding to the speed of the vehicle and the sine-cosine potentiometer 119 is adjusted in accordance with the direction of travel of the vehicle. The waveform generators 117, 118 will thus produce repetitive sawtooth waveforms which are fed to the display 113 to produce a further interscan trace in the form of a line trace extending from the position of the vehicle determined by the signal generator 116 in the direction determined by the setting of the sine-cosine potentiometer 119. The interscan waveform period is of limited duration and hence the length of the line trace on the screen of the tube will be determined by the magnitudes of the rate of scan control voltages and hence by the setting of the adjustable voltage supply source 120. In operation the sine-cosine potentiometer 119 is adjusted so that the line extends from the position of the vehicle to the nearest point on the required track and the adjustable voltage supply source 120 is then adjusted so that the length of the line is such that it just reaches the displayed track line. With this arrangement the output of the adjustable voltage supply source 120 then represents the distance of the vehicle from the track and may either be displayed on an indicator 121 or transmitted to the vehicle, for example, by being applied to a modulator 122 for a radio transmitter 123. Instead of controlling the voltage fed to the sine-cosine potentiometer 119, a constant voltage supply could be used and the duration of the gate defining the duration of the interscan trace adjusted to control the length of the trace.

With the arrangement of FIGURE 5, the distance along the track may be obtained from the co-ordinates of the end of this interscan trace which starts from the target position. The co-ordinates of the end of the line may be determined by pulse sampling and compared with the co-ordinates of a datum position along the length of the track line to determine the distance along the track from the datum position.

We claim:

1. Apparatus for controlling the navigation of a vehicle along a required track comprising two electrical waveform generators arranged to generate repetitive synchronised waveforms representative of the co-ordinates in plan position of the required ground track for the vehicle, a voltage source, a sine-cosine potentiometer connected to said source, manually operable voltage controlling means for controlling the voltage applied from said source to said sine-cosine potentiometer, and two comparator means for determining the differences between the output signals from the sine-cosine potentiometer and the corresponding co-ordinate instantaneous output signals of said waveform generators at simultaneously occurring instants in the waveform cycles and for providing from said determined differences an output representative of the distance of the vehicle from said track.

2. Apparatus for controlling the navigation of a vehicle along a required track comprising a radar system with a transmitter for radiating radio signals, a receiver for receiving echoes of the radiated signals from distant targets and a plan position cathode ray tube display for displaying the received echoes, signal generator means for generating signals representative of the co-ordinates of the ground position of the vehicle, two electrical waveform generators arranged to generate repetitive synchronised waveforms representative of the co-ordinates in plan position of the required ground track of the vehicle, electronic marker circuit means arranged to display, under the control of the signals from said signal generator means, a first electronic marker on said cathode ray tube in a position corresponding to the co-ordinates represented by the output signals of said signal generator means and arranged to display, under the control of the signals from said waveform generators, a second electronic marker on said cathode ray tube in the form of a line trace representing the required ground track, and two comparator means for determining the differences between the signals from said signal generators and the corresponding co-ordinate instantaneous output signals of said waveform generators at simultaneously occurring instants in the waveform cycles and for providing from said determined differences an output representative of the distance of the vehicle from said track.

3. Apparatus as claimed in claim 2 wherein said signal generator means comprises an adjustable speed signal generator, an adjustable course signal generator and means controlled by the speed signal generator and course signal generator to produce co-ordinate outputs representative of the changing position of the vehicle in accordance with the settings of the speed and course signal generators.

4. Apparatus as claimed in claim 2 wherein said comparator means comprise a repetitive pulse producing generator producing a pulse in each cycle of the waveform generators which changes in position in successive cycles at a predetermined rate and pulse sampling demodulators controlled by said pulse producing generator to sample the outputs of said waveform generators at time instants in the repetition cycle of the waveform generators which change slowly at said predetermined rate.

5. Apparatus for controlling the navigation of a vehicle along a straight line track extending from a datum position on the ground in a predetermined direction comprising a marker signal generator for generating signals representative of the co-ordinates of the ground position of the vehicle, a datum position signal generator for generating signals representative of the co-ordinates of said datum position, subtracting circuits for determining the differences of corresponding co-ordinate signal outputs of said marker signal generator and said datum position signal generator, two resolving means for resolving respectively the signals representative of the two said differences into components along and at right angles to said predetermined direction, two combining means for combining the two resolved components along the track to provide a first output and for combining the two resolved components along the track to provide a second output and means for indicating the magnitudes of said first and second outputs.

6. Apparatus as claimed in claim 5 and comprising a radar system with a transmitter for radiating radio signals, a receiver for receiving echoes of the radiated signals, a plan position cathode ray display tube for displaying the received echoes and an electronic marker system controlled by said marker signal generator for displaying on said cathode ray display tube a marker trace in a position corresponding to the co-ordinates represented by the output signals of said marker signal generator.

7. Apparatus as claimed in claim 5 in combination with a radio transmitter arranged to transmit signals representing said first and second outputs and a receiver on the vehicle for receiving the signals from said radio transmitter and for providing output signals on the vehicle corresponding to said first and second outputs.

8. Apparatus for controlling the navigation of a vehicle along a required track comprising two electrical waveform generators arranged to generate repetitive synchronised waveforms representative of the co-ordinates in plan position of the required ground track for the vehicle, two pulse sampling demodulators arranged to sample said synchronised waveforms simultaneously to produce signals representative of the co-ordinates of a point on said track, control means for said pulse sampling demodulators arranged to control the timing of the sampling pulses so that the sampling points occur at instants in successive cycles changing progressively at a predetermined rate, radar apparatus providing signals representative of the co-ordinates in plan position of the position of the vehicle, and two comparator means for determining the differences between the signals representative of the co-ordinates of the vehicle position and the corresponding co-ordinate signals from said pulse sampling demodulators.

9. Apparatus as claimed in claim 8 wherein there are provided two resolving means for resolving respectively the signals representative of said differences into components along and at right angles to a predetermined direction, and two combining means for combining the two resolved components in said direction to provide a first output and for combining the two resolved components at right angles to said direction to provide a second output.

10. In apparatus for controlling the navigation of a vehicle, the combination of two electrical waveform generators arranged to generate repetitive synchronised waveforms representative of the co-ordinates in plan position of the required ground track for the vehicle, a timing waveform generator producing a repetitive linearly varying sawtooth waveform synchronised with the output of said electrical waveform generators, a control signal generator producing a signal varying in amplitude at a predetermined rate over a period containing many cycles of the output of said electrical waveform generators, comparator means arranged to produce an output pulse each time the output of said timing waveform generator bears a predetermined amplitude relationship to the output of said control signal generator, and two pulse sampling demodulators controlled by said comparator means to sample simultaneously the synchronised waveforms from said electrical waveform generators to produce signals representative of the co-ordinates of a point on said ground track.

11. The combination as claimed in claim 10 wherein said control signal generator comprises a linearly varying waveform generator with adjustable means for controlling the rate of variation of the linearly-varying signal output.

12. The combination as claimed in claim 11 wherein said adjustable means are provided on said control signal generator for controlling the datum level of the start of the linearly-varying signal output.

13. In radar apparatus having a plan position radar display on a cathode ray tube with orthogonal deflector means; apparatus for controlling the navigation of a vehicle comprising an electronic marker system producing two marker signal outputs representative of the two co-ordinates of a position in a rectangular co-ordinate system, means for applying said marker signal outputs to said orthogonal deflector means to produce a marker on said display, control means for said marker system to make said marker track on said display follow the radar response from said vehicle, two electrical waveform generators arranged to generate repetitive synchronised waveforms representative of the co-ordinates in plan position of the required ground track for the vehicle, two pulse sampling demodulators arranged to sample said synchronised waveforms simultaneously to produce signals representative of the co-ordinates of a point on said track, control means for said pulse sampling demodulators arranged to control the timing of the sampling pulses so that the sampling points occur at instants in successive cycles changing progressively at a predetermined rate, and two comparator means for determining the differences between the marker signal outputs representative of the co-ordinates of the position of the tracking marker and the corresponding co-ordinate signals from said pulse sampling demodulators.

14. Apparatus as claimed in claim 13 wherein said control means for said pulse sampling demodulators comprises a timing waveform generator producing a repetitive linearly varying sawtooth waveform synchronised with the output of said electrical waveform generators, a control signal generator producing a signal varying in amplitude at a predetermined rate over a period containing many cycles of the output of said electrical waveform generators, comparator means arranged to produce an output pulse each time the output of said timing waveform generator bears a predetermined amplitude relationship to the output of said control signal generator, and means for applying said output pulse to said pulse sampling demodulators to control the times of the sampling pulses.

15. Apparatus as claimed in claim 13 wherein said electronic marker system comprises an adjustable speed signal generator arranged to produce two rate control signals representative respectively of the two components of a selected speed in a selected direction, an adjustable initial position signal generator for producing datum control signals representative of the co-ordinates of a selected datum position, and a pair of electrical waveform generators controlled by said speed signal generator and said initial position signal generator to produce each a linearly varying waveform varying slowly over many cycles of said repetitive waveforms at rates controlled by the respective rate control signals and starting from levels controlled by the respective datum control signals.

16. In apparatus for the radar control of a vehicle along a selected track; the combination of means for producing a first pair of signals representative of the co-ordinates of the actual position of the vehicle in a rectangular co-ordinate system, means for producing a second pair of signals representative of the co-ordinates of the scheduled position on said track in the same co-ordinate system, two subtracting means for producing signals representative of the differences, in the two co-ordinate directions respectively, of the signals of said first and second pair, a pair of resolving means arranged to resolve the difference signals in a predetermined direction and at right angles thereto, and a pair of combining means arranged to combine respectively the two resolved components in said predetermined direction and the two resolved components at right angles to said predetermined direction.

17. Apparatus for controlling the navigation of a vehicle comprising first signal generator means arranged to generate electrical signals representative of the Cartesian coordinates of the instantaneous position of the vehicle, further signal generator means arranged to generate two sets of repetitive synchronised waveforms the amplitudes of which are linearly dependent on the coordinates which define a required track in the said coordinate system, and computing means responsive to the signals from said first signal generator means and the signals defining the required ground track to provide an output representative of the distance of the point represented by signals from said first signal generator means from the track defined by the output of said further signal generator means.

18. Apparatus for controlling the navigation of a vehicle when the required track in plan position is a straight line comprising first signal generator means arranged to generate two signals representative in Cartesian coordinates of the plan position of the vehicle, further signal generator means arranged to provide two signals representative of the coordinate position in the same coordinate system of a point on the required ground track and also at least one signal representative of the angular direction of the required ground track and computing means, responsive to the signals from first signal generator means and the signals defining a required ground track and arranged to determine the differences between the outputs from said first signal generator means and the corresponding outputs from said further signal generator means representative of said point, resolving means controlled in accordance with said signal representative of the angular direction of the required ground track arranged to resolve said differences into components along and transverse to the track and combining means to combine the resolved components transverse to the track to provide an ouput representative of the distance of the vehicle from said track.

19. Apparatus as claimed in claim 18 wherein there are also provided combining means to combine the resolved components along the track to provide an output dependent on the distance of the vehicle along said track from said point.

20. Apparatus for controlling the navigation of a vehicle along a required track comprising electrical waveform generators arranged to generate repetitive synchronized waveforms whose amplitudes are linearly dependent on the Cartesian coordinates defining the required ground track in plan position, signal generator means arranged to generate electrical signals representative of the coordinates in plan position of the instantaneous position of the vehicle in said coordinate system and comparator means for determining the difference between the signals representative of the vehicle position and the corresponding coordinate instantaneous output signals of said waveform generators at simultaneously occurring instants in the waveform cycles and for providing from said determined differences an output representative of the distance of the vehicle from said line.

21. Apparatus for controlling the navigation along a required track comprising electrical waveform generators arranged to generate repetitive synchronized waveforms whose amplitudes are linearly dependent on the Cartesian coordinates defining the required ground track in plan position, signal generator means arranged to generate electrical signals representative of the coordinates of the instantaneous plan position of the vehicle in said coordinate system and comparator means for including pulse sampling demodulators for sampling and storing voltages representative of the required instantaneous output signals of the waveform generators at simultaneously occurring instants in the waveform cycles of said waveform generators, means for obtaining difference signals in the coordinate directions between the signals representative of the vehicle position and the sampled voltages and resolving and combining means controlled in accordance with the direction of the track at the point corresponding to the sampling position for resolving and combining the difference signals to provide an output representative of the distance of the vehicle from said line.

22. Apparatus as claimed in claim 21 wherein said resolving and combining means are arranged also to provide an output representative of the distance of the vehicle along said track from a selected point on the track.

23. Apparatus as claimed in claim 21 wherein a rate-aiding circuit is provided for controlling the instant of sampling of said pulse sampling demodulators so that the sampling point traverses along the track at an adjustable rate which may be set to correspond to the speed of the vehicle.

References Cited in the file of this patent

UNITED STATES PATENTS

| | | |
|---|---|---|
| 2,480,068 | Wolff | Aug. 23, 1949 |
| 2,535,107 | Wallace | Dec. 26, 1950 |
| 2,582,588 | Fennessy | Jan. 15, 1952 |
| 2,584,599 | Luck | Feb. 5, 1952 |
| 2,741,760 | Franke | Apr. 10, 1956 |
| 2,980,902 | Tasker | Apr. 18, 1961 |
| 3,071,765 | Schutz | Jan. 1, 1963 |